United States Patent [15] 3,647,942

Siegel [45] Mar. 7, 1972

[54] VIDEO COLOR SYNTHESIZER

[72] Inventor: Eric J. Siegel, c/o Tom Tadlock 2143 Pine Street, San Francisco, Calif. 94115

[22] Filed: Apr. 23, 1970

[21] Appl. No.: 31,090

[52] U.S. Cl. ..........178/5.4, 178/6.8

[51] Int. Cl. ..........H04n 9/02

[58] Field of Search ..........178/6.8, 5.2, 5.4, 69.5 CB

[56] References Cited

UNITED STATES PATENTS

| | | | |
|---|---|---|---|
| 3,551,589 | 12/1970 | Moskovitz | 178/5.4 |
| 2,982,814 | 5/1961 | Fine et al. | 178/6.8 |
| 2,874,217 | 2/1959 | Diehl | 178/69.5 CB |

*Primary Examiner*—Richard Murray
*Attorney*—Hubbell, Cohen & Stiefel

[57] ABSTRACT

An apparatus for synthesizing pseudocolor video signals from composite monochromatic video signals. Means are provided for producing a color burst signal on the back porch of the pseudocolor video signal from a monochromatic horizontal sync pulse. Such means includes a color subcarrier oscillator, a pulse generator which stretches the horizontal sync pulse to accommodate the proper period of the subcarrier frequency and slightly delay its occurrence, and a burst gate which produces the burst frequency from the subcarrier and stretched pulses. A pseudochrominance portion of the color video signal is produced by means which phase modulate the color subcarrier with the monochromatic video signal to produce a pseudohue signal and mix this hue signal with the video information portion of the monochromatic signal. An output mixer is also provided for mixing this pseudochrominance signal with the color burst and the monochromatic video signal to provide the pseudocolor video signal. Upon reception by a color video receiver, the monochromatic picture is reproduced in subjective color, the hues therein varying in accordance with the changes in the gray level of the monochromatic video information.

15 Claims, 3 Drawing Figures

Patented March 7 1972
3,647,942
2 Sheets-Sheet 1
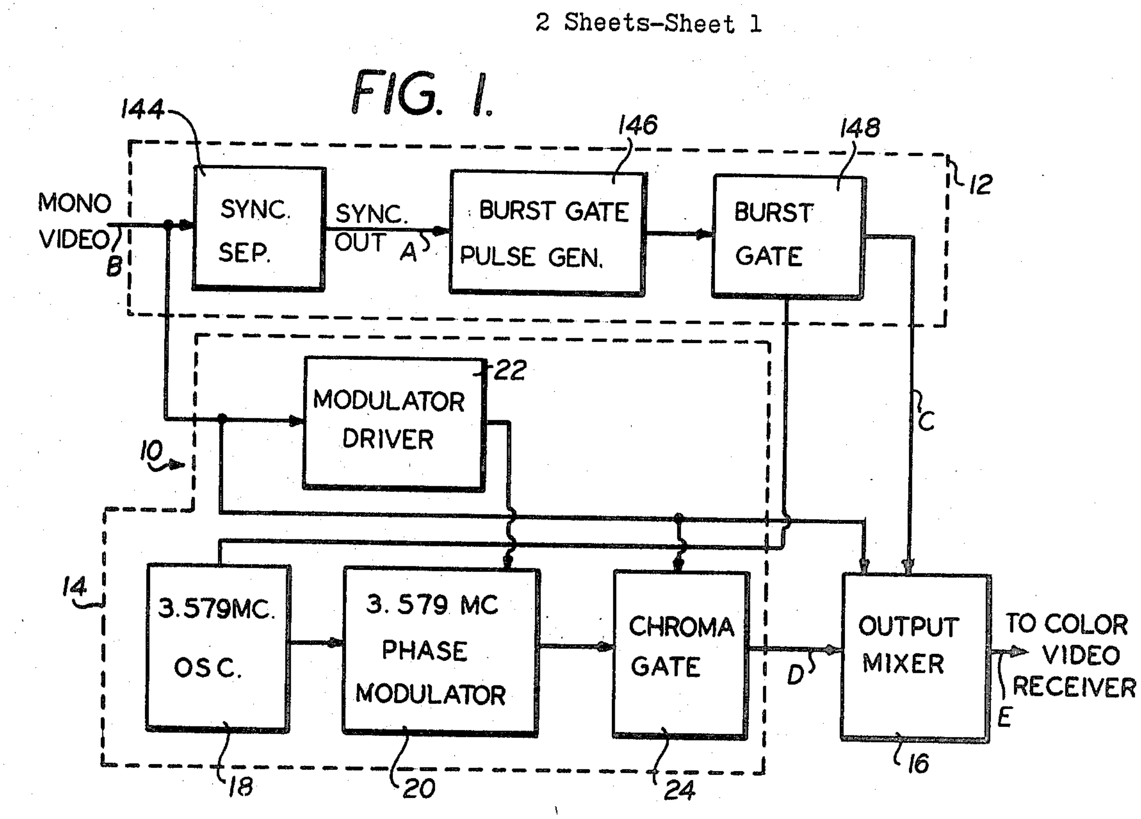
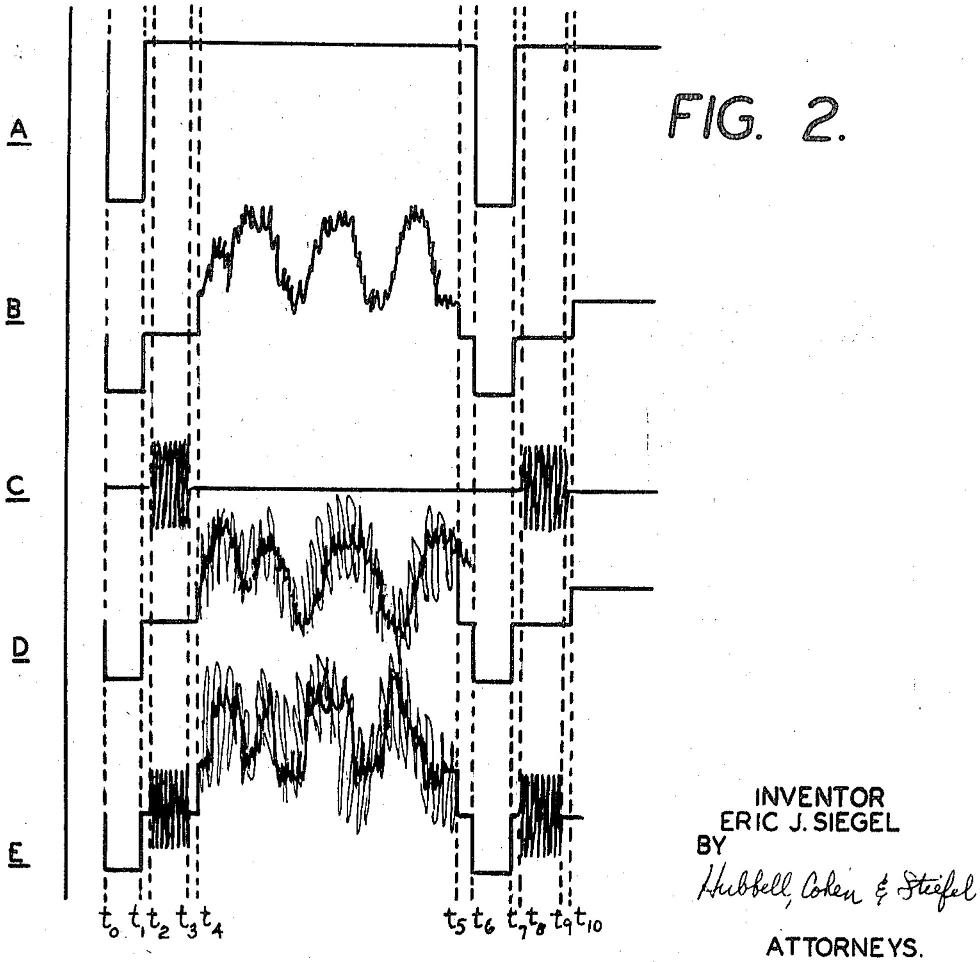
FIG. 2.
INVENTOR
ERIC J. SIEGEL
BY
Hubbell, Cohen & Stiefel
ATTORNEYS.

INVENTOR
ERIC J. SIEGEL
BY *Hubbell, Cohen & Stiefel*
ATTORNEYS

VIDEO COLOR SYNTHESIZER

BACKGROUND OF THE INVENTION

1. Field of the Invention

The present invention relates to an apparatus for producing from black and white video signals, video signals having portions which produce arbitrarily colored video pictures when applied to color video receiver.

2. Description of the Prior Art

Prior art subjective color systems, that is systems which do not reproduce the true color content of a scene, have utilized rotating discs, such as Benham discs, to produce subjective colors. The Benham disc is a disc having only black and white patterns thereon. When this disc is rotated, some of the patterns appear to the observer to be in color. The production of this color is wholly subjective, being solely dependent on the repetition of a certain sequence of dark and light areas, or lines. Prior art subjective color video systems have employed such discs to provide color pictures on black and white television receivers by encoding transmitted signal. These systems, however, require a special film in order to effect the desired transmission of signals which result in the subjective color phenomenon in the black and white receiver. In an attempt to overcome this deficiency of prior art subjective color systems, systems have been employed which utilize complementary color filters to convert colored light from a scanned scene into corresponding dark areas on a white background in combination with a major dark, or black area in a Benham disc-type color code. These patterns are caused to repeat in an established sequence by rotation of the disc so that the original colors are subjectively reproduced. In order to produce the subjective color phenomenon, however, the disc must be rotated at a frequency in the range of 2 to 100 revolutions per second which results in the production of a considerable flicker in the observed picture. Such flicker is disturbing to the viewer and elaborate means must be utilized to minimize this flicker. Other systems have utilized rotating drums to accomplish the same result as obtained by the use of a rotating disc. However, such drums also produce a disagreeable flicker. Furthermore, the use of these subjective color systems requires a modification to the television camera at the transmitting studio so that the subjective colors can be produced. This, therefore, requires that all persons receiving the broadcast receive the subjective color.

The production of a color video picture from a monochrome medium is another well-known phenomenon. However, these systems require that actual color information be encoded, by such means as a filter, and then recorded on a monochrome record medium. When the signal so recorded is played back on a color video receiver, the actual color content of the video signal is obtained. These systems require the initial transmission of a color video signal having a color burst portion, a luminance portion, and a chrominance portion which has hue and saturation characteristics. Hue represents a particular color and controls the phase of the chrominance portion, and saturation represents the degree to which the color is mixed with white, or in other words, the intensity thereof, and controls the amplitude of the chrominance portion. This color video signal must then be encoded so as to be recorded on the monochrome record medium for subsequent decoding by the color video receiver. These systems are not capable of converting a monochromatic video signal, which is a black and white television signal, into a subjective color video signal, as such a monochromatic video signal does not contain hue and saturation characteristics which are necessary for the color video receiver to reproduce colors.

SUMMARY OF THE INVENTION

An apparatus for synthesizing pseudocolor video signals, which are monochromatic video signals having characteristics which correspond to those of color video signals, from which composite monochromatic video signals containing synchronizing and information portions. The synthesizer includes a means for producing a synchronized color burst signal and a means for producing a pseudochrominance signal, which is a signal having characteristics corresponding to those of a true chrominance signal, from the composite monochromatic video signal. The color burst signal is produced from the monochromatic horizontal sync signal by means which include a color subcarrier oscillator, a pulse generator which stretches the horizontal sync pulse to accommodate the proper period of the subcarrier frequency and slightly delay its occurrence, and a burst gate which produces the burst frequency from the subcarrier and stretched pulses. The pulse generator provides a period for the burst pulse which is substantially equal to the period of the pseudocolor video signal so that the burst signal occurs on the back porch of the color video signal. The pseudochrominance signal producing means includes a phase modulator which is operatively connected to the subcarrier oscillator and the monochromatic video signal to phase modulate the color subcarrier with the monochromatic video signal to produce a pseudohue signal, which is a signal having a characteristic which corresponds to the hue portion of a chrominance signal. Mixing means are included to mix the phase modulated pseudohue signal with the video information portion of the monochromatic signal. This mixed signal corresponds to the pseudochrominance portion of the color video signal. Additional mixing means are provided for mixing the pseudochrominance signal with the color burst and the composite monochromatic video signal to produce the pseudocolor video signal.

BRIEF DESCRIPTION OF DRAWING

FIG. 1 is a block diagram of the preferred embodiment of the present invention;

FIG. 2 is a hypothetical graphical illustration of the signals present in various portions of the embodiment shown in FIG. 1.

DETAILED DESCRIPTION OF THE PREFERRED EMBODIMENT

Figure 3:
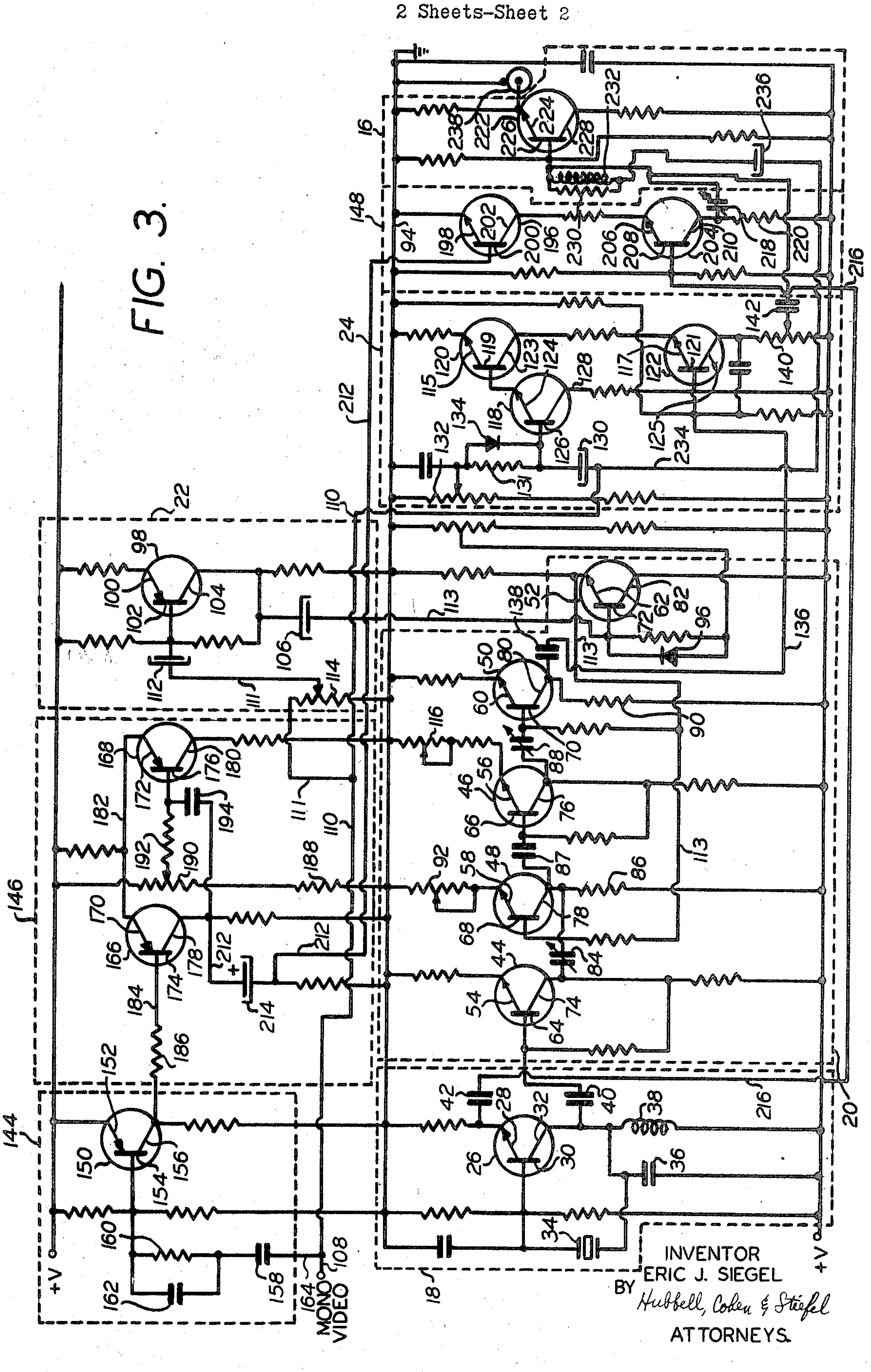
FIG. 3 is a schematic diagram of the embodiment shown in FIG. 1.

Referring now to the figures in detail, FIG. 1 is a block diagram of the color video synthesizer of the present invention, which synthesizer is generally referred to by the reference numeral 10. The synthesizer 10 includes color burst generation circuitry, generally referred to by the reference numeral 12, which will be explained in greater detail hereinafter; and circuitry, generally referred to by the reference numeral 14, and which will be explained in greater detail hereinafter, for generating a pseudochrominance signal, which is a monochromatic video signal having the characteristics of a normal color video chrominance signal in that it contains hue and saturation signal characteristics, although these characteristics are preferably not directly related to actual or true color information. Furthermore, the synthesizer 10 preferably includes a combining means 16 for combining the pseudochrominance signal generated by the chrominance generation circuitry 14 with the color burst signal generated by the burst circuitry 12 and the input signal to the video synthesizer 10, which is preferably a composite monochromatic standard black and white video signal having synchronizing and information portions, to produce a pseudocolor video signal in a manner to be described in greater detail hereinafter. The term pseudocolor video signal refers to a video signal having the signal characteristics of a color video signal, namely, burst, hue and saturation, although not containing any actual or true color information portions.

PSEUDOCHROMINANCE SIGNAL CIRCUITRY

The pseudochrominance signal circuitry 14, whose operation will be described in greater detail hereinafter, preferably includes a subcarrier oscillator 18; a phase modulator 20 and modulator driver 22 for phase modulating the subcarrier signal; and a chroma gate 24, which is a gated mixer, to be described in greater detail hereinafter, for preferably mixing the phase modulated signal with the information portion of the monochromatic video signal.

As shown in FIG. 3, the subcarrier oscillator 18 is preferably a conventional crystal oscillator which includes a transistor 26 having an emitter 28, a base 30, and a collector 32, and a piezoelectric crystal 34, which is connected in the collector circuit between the collector 32 and the base 30 of transistor 26. The crystal 34 is connected in the series-resonant mode and preferably has a resonant frequency equivalent to the standard color subcarrier frequency, which is 3.579 MegaHertz. A parallel tank circuit, consisting of capacitor 36 and inductor 38 is preferably connected between the collector 32 and the crystal 34. Output capacitors 40 and 42 are each connected in parallel to the collector 32, and emitter 28, respectively, of transistor 26 of the oscillator 18. The balance of the conventional circuitry associated with the oscillator 18 will not be explained in greater detail, as it will readily be understood by one of ordinary skill in the art.

The collector 32 of the subcarrier oscillator 18, through output capacitor 40, is connected to the phase modulator 20, to be described in greater detail hereinafter. The phase modulator 20 preferably includes a transistor amplifier stage illustratively shown as two stages 44 and 46; a transistor phase modulator stage, illustratively shown as two stages 48 and 50, which are connected respectively to the outputs of amplifier stages 44 and 46; and an emitter driver, or buffer stage 52 connected to transistor phase modulator stage 48 of the phase modulator 20. Transistors 44, 46, 48, 50 and 52 have emitters 54, 56, 58, 60 and 62, respectively; bases 64, 66, 68, 70 and 72, respectively; and collectors 74, 76, 78, 80 and 82, respectively. Connected to the collector 78 of the phase modulator stage 48 is a parallel R-C voltage dividing network preferably comprising a variable capacitor 84 and a resistor 86, whose operation will be described in greater detail hereinafter. Similarly, a parallel R-C voltage dividing network preferably comprising a variable capacitor 88 and a resistor 90 is connected between the collector 80 and the base 70 of the output phase modulator stage 50.

The base 64 of the first amplifier stage 44 is the point of connection of the collector 32 of transistor 26 of oscillator 18 through output capacitor 40 to the phase modulator 20. The collector 74 of transistor 44 is connected in parallel to variable capacitor 84. The balance of the amplifier stage 44 is conventional and will not be explained in greater detail as it will be readily understood by one of ordinary skill in the art.

The emitter 58 of input phase modulator stage 48 has a variable emitter bias resistor 92, for a purpose to be described in greater detail hereinafter, connected between the emitter 58 and ground 94. The base 68 of phase modulator stage 48 is connected to the emitter 62 of the buffer stage 52, which is a conventional emitter driver circuit which will not be explained in greater detail hereinafter as it will readily be understood by one of ordinary skill in the art. The buffer stage 52 preferably includes a DC restorer diode 96 connected in parallel between the base 72 of transistor 52 and ground 94. The base 72 of transistor buffer 52 is also connected in parallel to modulator driver 22, to be explained in greater detail hereinafter.

The modulator driver 22 is preferably a conventional wide band, or video transistor amplifier including a transistor 98 having an emitter 100, base 102, and collector 104. The circuitry associated therewith is conventional and will not be described in greater detail hereinafter as it will readily be understood by one of ordinary skill in the art. The collector 104 circuit of transistor 98 is connected in parallel to the base 72 of buffer stage 52 through a capacitor 106, illustratively shown as being electrolytic, the symbol therefor being hereinafter used for all electrolytic capacitors illustratively shown in the synthesizer 10 schematic of FIG. 3. This is the point of connection between the modulator driver 22 and the buffer stage 52. The base 102 of transistor 98 is connected in parallel to the monochromatic video signal input 108 via path 110 which preferably includes a capacitor 112, illustratively shown as being electrolytic, and a potentiometer 114.

The collector 78 circuit of the input phase modulator stage 48 is connected to the base 66 of the second amplifier stage 46. The emitter 56 of the second amplifier stage 46 has a variable emitter bias resistor 116, for a purpose to be described in greater detail hereinafter, connected between the emitter 56 and ground 94. The balance of the circuitry associated with the amplifier stage 46 and the input phase modulator stage 48 is conventional and will not be explained in greater detail hereinafter as it will readily be understood by one of ordinary skill in the art. The collector 76 of the amplifier 46 is connected to the variable capacitor 88 associated with the output phase modulator stage 50 which is in turn connected to the base 70 of phase modulator stage 50. The balance of the circuitry associated with phase modulator stage 50 is conventional and will not be explained in greater detail hereinafter as it too will be understood by one of ordinary skill in the art. The collector 80 circuit of the output phase modulator stage 50 is connected to the chroma gate 24, to be described in greater detail hereinafter.

The chroma gate 24 circuit configuration is preferably a gated mixer circuit having a gating stage which comprises transistor 118, having an emitter 124, a base 126 and a collector 128; and a mixing stage which comprises the series connected transistors 120 and 122, each having an emitter 115 and 117, respectively; a base 119 and 121, respectively; and a collector 123 and 125, respectively. The chroma gate 24 is so termed because it provides a pseudosaturation characteristic for the pseudochrominance signal in a manner to be described in greater detail hereinafter. The base 126 of transistor 118 is connected in parallel via path 110, which preferably includes a capacitor 130, illustratively shown as being electrolytic, to the monochromatic video signal input 108. A bias resistor 131, which preferably includes a variable resistor portion 132, is connected in parallel to the base 126 of transistor 118 and is, preferably, adjustable to vary the bias of transistor 118 so that transistor 118 conducts, or in other words, in ON, only when the level of the monochromatic video signal is above the black level of the signal. This is the level below which synchronizing signals are transmitted and above which video information signals are transmitted. A DC restorer diode 134 is connected in parallel between the base 126 and ground 94.

The emitter 124 of transistor 118 is connected directly to the base 119 of transistor 120 of the mixer stage whose emitter 115 is grounded. The collector 123 of transistor 120 is connected to the emitter 117 of the other transistor 122 of the mixer stage. The base 121 of transistor 122 of the mixer stage series connected pair 120 and 122 is the point of connection in the chroma gate circuit 24 from the collector 80 of the output phase modulator 50. This connection is a parallel connection via path 136 which preferably includes a capacitor 138. The balance of the mixer stage portion of the circuitry 24 is conventional and will not be described in greater detail hereinafter as it will readily be understood by one of ordinary skill in the art. The output circuit portion of the chroma gate 24 preferably comprises collector 121 of transistor 122, potentiometer 140 and capacitor 142.

COLOR BURST GENERATION CIRCUITRY

The color burst generation circuitry 12, whose operation will be described in detail hereinafter, preferably includes a sync separator 144, which is a conventional circuit whose purpose is to separate the sync pulses from a composite video signal having sync and information portions; a burst gate pulse generator 146 for stretching and delaying the sync pulses; and a burst gate 148 for passing the color burst signal. The sync separator 144 includes a transistor 150, having an emitter 152, a base 154, and a collector 156, which is connected in a typical clipper configuration which is conventional and will thus not be described in greater detail. Suffice it to say that the sync separator circuit preferably includes a capacitor 158 connected to a parallel R-C combination of a resistor 160 connected in parallel with a capacitor 162, with the base 154 of transistor 152 connected in parallel with the composite monochromatic video signal input 108 via path 164 which includes the series-parallel combination of the capacitor 158 and the R-C combination 160–162.

The collector 154 of transistor 150 of the sync separator circuit 144 is connected to the burst gate pulse generator 146, to be described in greater detail hereinafter. The burst gate pulse generator 146 is, preferably, essentially a conventional Schmitt trigger type of pulse stretcher circuit for a negative input pulse, although a positive pulse stretcher could be substituted therefor if a positive sync pulse was to be stretched. This circuit 146 includes a pair of transistors 166 and 168, each having an emitter 170 and 172, respectively; a base 174 and 176, respectively; and a collector 178 and 180, respectively; which are emitter coupled 170–172 to provide a feedback path 182 therebetween. The collector 156 of transistor 152 is connected to the base 174 of transistor 166 via path 184 which preferably includes a resistor 186. This is the point of connection between the sync separator 144 and the burst gate pulse generator 146. The time constant provided by the R-C combination of resistor 186 and the internal capacitance of transistor 166 slightly delays the output signal from the collector 178 of transistor 166, as will be explained in greater detail hereinafter. The collector 178 of transistor 166 is connected in parallel to the base 176 of transistor 168 through a parallel R-C combination which preferably includes a resistance portion comprising a resistor 188 and a potentiometer which includes resistors 190 and 192, and a capacitance portion comprising capacitor 194. As will be explained in greater detail hereinafter, this parallel R-C combination 188–190–192–194 together with transistor 168 provides the pulse stretching function for the burst gate pulse generator 146 so as to effectively increase the pulse width at the collector 178 of the input pulse present at the base 174 of transistor 166. The potentiometer 190–192 provides a means for varying the R-C time constant for transistor 168. The balance of the burst gate pulse generator circuitry 146 is conventional and will not be explained in greater detail hereinafter.

The collector 178 of transistor 166 of the burst gate pulse generator 146 is also connected in parallel to the burst gate 148, to be described in greater detail hereinafter. The burst gate 148, whose operation will be described in greater detail hereinafter, preferably includes a conventional overdriven transistor amplifier 196, having an emitter 198, a base 200, and a collector 202; and a transistor 204, having an emitter 206, a base 208, and a collector 210, connected in a series saturating gate configuration with the emitter 206 of transistor 204 connected to the collector 202 of transistor 196. The base 200 of transistor 196 is connected in parallel to the collector 178 of transistor 166 via path 212 which includes capacitor 214, which is shown and preferred as being electrolytic. This is the point of connection of burst gate 148 to burst gate pulse generator 146. The emitter 198 of transistor 196 is connected to ground 94. The base 208 of transistor 204 is connected in parallel via path 216, which includes the output capacitor 42, to the collector 28 of transistor 26 of the fixed frequency oscillator 18, which is the point of connection between the oscillator 18 and the burst gate 148. The output circuit for the burst gate 148 preferably includes a variable capacitor 218 connected in parallel with resistor 220 to the collector 210 of transistor 204. The balance of burst gate circuitry 148 is conventional and will not be described in greater detail hereinafter.

OUTPUT MIXER CIRCUIT

The monochromatic video signal from input 108, the burst gate 158, and the chroma gate 24 are connected in parallel to the output mixer 16, to be described in greater detail hereinafter. The output mixer circuit 16, whose operation will be described in greater detail hereinafter, preferably is a conventional mixer including a transistor 222 having an emitter 224, a base 226, and a collector 228. A resistor 230 and an inductor 232 are connected in parallel between the base 226 of transistor 222 and the monochromatic video signal input 108 via path 234 which includes capacitor 236, shown and preferred to the electrolytic, and path 110. This is the point of connection between the output mixer 16 and the monochromatic video input 108. The base 224 of transistor 222 is also connected in parallel with the collector 210 of burst gate 148 via variable capacitor 218, which is the point of connection between the output mixer 16 and burst gate 148; and with the collector 125 of transistor 122 via capacitor 142 and resistor 140. The latter is the point of connection between the output mixer 16 and the chroma gate 24. The output portion of the output mixer circuit 16 preferably includes a coaxial cable 238 for connection to a color video receiver, not shown.

OPERATION

For ease in understanding the operation of the video color synthesizer 10 of the present invention, the operation of the associated circuitry to produce the color burst signal will be described first, then the production of the pseudochrominance signal, and lastly the production of the composite pseudocolor video signal. In a manner to be described in greater detail hereinafter, the composite monochromatic video signal is fed to the sync separator circuit 144 to produce the color burst signal; to the modulator driver circuit 122 and the chroma gate 24 to produce the pseudochrominance signal; and to the output mixer circuit 16 to produce the composite pseudocolor video signal.

The sync separator circuit 144 clips off all signals above the blanking level of the composite monochromatic video signal, shown illustratively in FIG. 2B, which is the level that separates picture information from synchronizing information in a composite video signal and which coincides with the level of the base of the sync pulses, so that only the sync signals are permitted to pass. This produces a pulse train of sync pulses, illustratively shown in FIG. 2A. The sync separator circuit 144 is adjusted so that the bias voltage applied to the base 154 of transistor 150 drives the transistor 150 to cut off at the blanking level. As a result the transistor 150 is cut off at all times, except when a negative sync pulse whose amplitude is lower than the blanking level is applied thereto. The occurrence of the sync pulses permit a momentary flow of collector current in transistor 150. The synchronizing pulses are fed from transistor 150 via collector 156 along path 184 to the base 174 of transistor 166 of the burst gate pulse generator 146.

The burst gate pulse generator 146 performs several functions. It is constructed preferably to operate responsive only to the horizontal synchronizing pulses of the synchronizing signal present on path 184. As was previously mentioned, the burst gate pulse generator 146 is essentially a conventional pulse stretcher circuit for pulse-stretching a negative pulse. Emitter coupled transistors 166 and 168 are normally reverse-biased to be OFF. When an input pulse, which is the sync pulse, is supplied from the sync separator 144 through resistor 186 via path 184, to the base 174 of transistor 166 of the burst gate pulse generator 146, this overcomes the reverse bias of transistor 166 and forward biases transistor 166 to turn it ON. There is a slight delay in transition from the OFF condition to the ON condition of transistor 166 due to the time constant of the R-C combination of resistor 186 and the internal capacitance of transistor 166. The leading edge of the output pulse from collector 176 of transistor 166 does not start coincidentally with the leading edge of the monochromatic video signal sync pulse due to this slight delay, for a purpose to be explained in greater detail hereinafter. The output of transistor 166 from collector 178, which is a pulse whose width is determined by the parallel R-C combination 188–190–92–194, is fed in parallel to the base 200 of transistor 196 of the burst gate 148, whose operation will be described in greater detail hereinafter, and to the base 176 of transistor 168 through the parallel R-C combination 188–190–92–194. The signal through the parallel R-C combination 188–190–192–194 is a trigger signal which overcomes the reverse bias of transistor 168 and turns transistor 168 ON. Transistor 168, in the ON condition, through the emitter couple 172–170, continues to forward bias transistor 166 to keep transistor 166 ON, even after the sync pulse present on path 184 goes to zero, until the decay of the signal present at the output of the parallel R-C combination 188–190–92–194 has reduced the signal level on the base 176 below the normal reverse bias potential so that transistor 168 is again reverse biased at which time it turns OFF. Since transistor 166 is no longer receiving an input pulse on base 174 nor a signal at emitter 170 which overcomes the normal reverse bias, transistor 166 is again reverse biased at which time it turns OFF and the trailing edge of the output pulse present on collector 178 occurs thereby terminating the pulse present on path 212. The pulse width of this slightly delayed output pulse present on path 212, which may be varied by varying the R-C time constant of the parallel R-C combination 188–190–92–194, is preferably adjusted to permit 8 cycles of the 3.579 MegaHertz subcarrier signal to occur within the duration of this output pulse from the burst gate pulse generator 146.

The subcarrier oscillator 18 operates as a conventional crystal fixed frequency oscillator having a piezoelectric crystal 56 tuned to the subcarrier frequency of 3.579 MegaHertz, and, provides a fixed output frequency of 3.579 MegaHertz via path 216 from the emitter 28 of transistor 26 to the base 208 of transistor 204 of the burst gate transistor pair 196 and 204 via path 171. When no pulse stretched signal is present on path 212, transistor 196, which is the gating transistor, is OFF and effectively an open circuit is present between transistor 204 and ground. In this OFF condition, the 3.579 MegaHertz signal is not passed by burst gate 148 through the collector 210 of transistor 204 which is the output transistor of burst gate 148. When the pulse stretched signal is present on path 212, that is, when it has a value other than zero, transistor 196 is ON and the effective output of transistor 196 is substantially a short circuit as long as the collector 202 is in the saturation region, which is the preferable point of operation for this gating transistor. In this ON condition, transistor 196 is effectively short circuited to ground, and burst gate 148 passes the 3.579 MegaHertz signal via collector 210 to the parallel R-C combination of capacitor 218 and resistor 220 and therethrough in parallel to the base 226 of transistor 222 of the output mixer 16. The switching levels of transistor 196 can, therefore, be described as OFF when no pulse is present on path 212 and ON when a pulse is present on path 212.

The output of transistor 204 is equivalent to a standard color burst signal, illustratively shown in FIG. 2C, preferably having 8 cycles of the 3.579 MegaHertz signal each time a stretched pulse occurs. Since the horizontal sync pulses from which the burst gate pulse are derived occur in the region of the back porch of the composite video signal, which by definition is the portion of a composite video signal that follows the horizontal sync pulse and extends to the trailing edge of the corresponding blanking pulse, the color burst signal will also occur in the region of the back porch, and will be slightly delayed from the occurrence of the horizontal sync pulse, due to the slight delay present in the gating pulse on path 212, as was previously explained. This color burst signal is equivalent to a standard color video color burst signal present in a composite color video signal.

Now that we have explained the derivation of the color burst signal, we shall describe the operation of the video color synthesizer 10 to produce the pseudochrominance portion of the composite pseudocolor video signal. The collector 32 output of the oscillator 18, which is the 3.579 MegaHertz signal, is fed through capacitor 40 to the base 64 of transistor 44 of the phase modulator 20 where it is amplified. This signal is the carrier signal input of the phase modulator 20. The monochromatic video signal is fed in parallel via path 110 and 111 to the modulator driver 22 where its signal level is boosted to the operating level of transistor 48 before being fed to the base 72 of the emitter driver 52. This amplified signal via path 113 including emitter driver 52 is fed to the base 68 of phase modulator transistor 48. The output of transistor 44, which is the 3.579 MegaHertz subcarrier signal, is fed in parallel, via variable capacitor 82, to the collector 78 output of transistor 48. In this manner the output of the fixed subcarrier oscillator 18 is connected in parallel to the output of the phase modulator transistor 48 and provides a phase modulated output signal from the R-C voltage divider network of capacitor 84 and resistor 86. Amplitude variations may also be present but they can be reduced by making the impedance of resistor 86 much greater than the impedance of capacitor 84.

The output of the transistor 48 R-C network 84–86 is in turn fed through capacitor 87 to the base 66 of amplifier 46 where it is amplified. The amplified phase modulated signal is in turn fed to the output phase modulator 50 via capacitor 88. The phase modulated output signal is fed from the collector 80 of transistor 50 via path 136 to the base 121 of transistor 122 of the chroma gate 24. This phase modulated signal is one in which the phase of the carrier wave, which is the 3.579 MegaHertz subcarrier, varies linearly with the modulating signal, which is the monochromatic composite video signal.

This phase modulated output signal corresponds to a pseudohue signal in that a hue signal for a particular color causes phase modulation of the color subcarrier in a standard color video transmission system. The variations in pseudohue in this phase modulated signal are due to the differences in gray level of the video information portion of the signal. The variations in the gray level may be altered by changing the bias 92 and 116 of the transistors 48 and 46, respectively, of the phase modulator circuitry 20. The hue present in the pseudohue signal would thereby be changed due to these alterations in the gray level.

As previously mentioned, the other characteristic of the chrominance signal is saturation, which may be defined as a variation in intensity of the hue, and which controls the amplitude of the chrominance signal in a standard color video transmission system. The composite monochromatic video signal is fed in parallel via path 110 to the base 126 of transistor 118 of the chroma gate 24. Transistor 118, which is the gating transistor, is biased to conduct only when the signal on path 110 exceeds the black level of the video signal. When transistor 118 conducts, only the video information portion of the signal is passed to the base 119 of transistor 120. When the signal on path 110 is below the black level, transistor 118 does not conduct and no signal is received by base 119 and mixing cannot occur between the monochromatic video signal input and the chroma gate 24 output signals. In this manner only the video information portion of the monochromatic video signal will be mixed with the phase modulated pseudohue signal so that the mixed output of the chroma gate 126 will be solely dependent on the amplitude of the video information portion of the monochromatic video signal. This effectively provides the pseudosaturation characteristic for the pseudochrominance signal, which is the mixed output signal present at the collector 210 of transistor 204 of the chroma gate 126, and is illustratively shown in FIG. 2D. This pseudochrominance signal, having both pseudohue and pseudosaturation characteristics, is fed to the base 226 of transistor 222 of mixer circuit 16 in parallel via capacitor 218, in parallel with the color burst signal via R-C network 140–142.

A composite color video signal, as is well known, has a luminance portion, as well as a chrominance and color burst portion. To provide the luminance portion of the composite pseudocolor video signal, the composite monochromatic video signal is fed in parallel via paths 110 and 234 and R-C network 230–232, to the base 226 of transistor 222 of the mixer circuit 16 in parallel with the color burst signal and the pseudochrominance signal. These three signals are mixed in a conventional manner to provide a mixed output having luminance and pseudochrominance superimposed thereon, as well as synchronizing and color burst signals present therein. Such a signal is illustratively shown in FIG. 2E. This mixed output is present at coaxial cable 238 and has all the characteristics of a composite color video signal, namely, chrominance, luminance, color burst, and synchronization, although not representing the true color content of the scene corresponding to the video information signal. This signal is therefore termed a pseudocolor video signal.

When this signal is fed to standard color receiver circuitry, not shown, the composite pseudocolor video signal is separated into monochromatic video and phase modulated signal portions. The phase modulated signal is equivalent to the chrominance signals of a true color video signal which are passed through the conventional color circuitry of the standard color receiver so as to produce a color picture. The presence of the color burst signal on the back porch prevents the chroma amplifier of the standard color receiver from producing a control signal to the color killer circuitry to shut off the color circuitry of the color receiver. Therefore, the color circuits stay ON and the pseudochrominance phase modulated signal is processed in the color circuitry in the same manner as a normal chrominance signal to produce a subjective color picture from the monochromatic video picture signal. The color, or hue, of the subjective color picture produced varies in accordance with the gray level of the monochromatic video information.

The present invention, as it is present and preferably contemplated to be used, produces arbitrarily colored video pictures on a color video receiver, which pictures are preferably not true color representations of the color content of the actual scene comprising the video information portion of a monochromatic video signal, so that various colorful, artistic and aesthetic effects may be produced on the color video receiver screen for this scene. Of course modifications might possibly be made to the circuitry of the present invention, if desired, to produce pictures which are truer representations of the color content of the actual scene if these artistic effects are not desired. Furthermore, by utilizing the present invention, these artistic effects may be produced by color designers from a standard black and white video transmission in a relatively easy manner without any modifications to the standard black and white video transmitting apparatus, or the standard color video receiving apparatus other than the passing of the received signal through the color video synthesizer before feeding the signal to the standard color receiver.

It is to be understood that the above-described embodiment of the invention is merely illustrative of the principles thereof and that numerous modifications and embodiments of the invention may be derived within the spirit and scope thereof.

What is claimed is:

1. An apparatus for synthesizing pseudocolor video signals from composite monochromatic video signals containing synchronizing and information portions, said pseudocolor video signals providing a subjective color display video presentation of said monochromatic video information portions, comprising:

means for producing a pseudochrominance signal having pseudohue and pseudosaturation characteristics from said composite monochromatic video signal, said pseudochrominance signal producing means including means for producing a color video subcarrier signal; and means for modulating said color subcarrier signal with said composite monochromatic video signal to produce a modulated signal having said pseudohue characteristic, said modulating means including means for varying the nature of the subjective display during a video presentation thereof so as to provide a varying subjective display of the monochromatic video information, said variations being controlled independently of said monochromatic video signal.

2. An apparatus in accordance with claim 1 wherein said pseudochrominance signal producing means further includes means for combining said modulated signal with said information portion of said composite monochromatic video signal to produce said pseudochrominance signal.

3. An apparatus in accordance with claim 1 wherein said apparatus includes means for producing a color burst signal synchronized with said monochromatic video signal; and means for combining said color burst signal with said pseudochrominance signal and said composite monochromatic video signal to produce said pseudocolor video signal.

4. An apparatus in accordance with claim 3 wherein said color burst signal producing means includes means for obtaining said synchronized color burst signal from said monochromatic synchronizing portion.

5. An apparatus in accordance with claim 4 wherein said obtaining means includes means for separating said synchronizing portion from said composite monochromatic signal.

6. An apparatus in accordance with claim 5 wherein said monochromatic synchronizing portion comprises synchronizing pulses, and said obtaining means further includes a burst pulse generator operatively connected to said separating means to produce a burst pulse signal from said monochromatic synchronizing portion pulse signal.

7. An apparatus in accordance with claim 6 wherein said burst pulse generator includes means for making the period of the burst pulse substantially equal to the period of the pseudocolor video signal so said color burst signal occurs on the back porch of the composite pseudocolor video signal.

8. An apparatus in accordance with claim 6 wherein said synchronizing portion includes vertical and horizontal synchronizing pulses, and said burst pulse generator includes means for obtaining said burst pulse solely from said horizontal synchronizing pulses.

9. An apparatus in accordance with claim 3 wherein said pseudocolor video signal includes a video information portion, a synchronizing portion and a color burst portion; and said color burst signal producing means includes means for making the period of occurrence of the color burst portion substantially equal to the period of the pseudocolor video signal so said color burst portion occurs on the back porch of the pseudocolor video signal spaced from said video information portion, and means for delaying the occurrence of said color burst portion with respect to said synchronizing portion so said color burst portion occurs after said synchronizing portion and spaced therefrom.

10. An apparatus in accordance with claim 1 wherein said modulating means includes a phase modulator, and means for driving said phase modulator.

11. An apparatus in accordance with claim 10 wherein said phase modulator driver includes means for increasing the signal level of said monochromatic video signal, said increased level signal being a driving signal for said phase modulator.

12. An apparatus in accordance with claim 1 wherein said means for varying the nature of the subjective display comprises means for varying the gray level of the monochromatic video signal information portion.

13. An apparatus in accordance with claim 1 wherein said pseudochrominance signal producing means further includes a means for combining said pseudohue signal with said monochromatic video signal.

14. An apparatus in accordance with claim 13 wherein said combining means includes means for combining said pseudohue signal with said monochromatic video signal information portion, said amplitude of said video information portion being a pseudosaturation signal, the output of said combining means being said pseudochrominance signal.

15. An apparatus in accordance with claim 14 wherein said combining means is a gated mixer means for mixing the pseudohue and monochromatic video signal only when the monochromatic video signal is above the black level for said monochromatic signal.

* * * * *